United States Patent

[11] 3,614,544

| [72] | Inventors | Wolfgang Mosebach<br>South Devon, England;<br>Christopher Peter Piper, Fife, Scotland |
|---|---|---|
| [21] | Appl. No. | 883,088 |
| [22] | Filed | Dec. 8, 1969 |
| [45] | Patented | Oct. 19, 1971 |
| [73] | Assignee | International Standard Electric Corporation<br>New York, N.Y. |
| [32] | Priority | Dec. 13, 1968 |
| [33] | | Great Britain |
| [31] | | 59340/68 |

[54] SOLID ELECTROLYTIC CAPACITORS HAVING AN ADDITIONAL INSULATED LAYER FORMED ON THE DIELECTRIC LAYER
7 Claims, 3 Drawing Figs.

[52] U.S. Cl........................................... 317/230,
317/231
[51] Int. Cl........................................... H01g 9/05
[50] Field of Search........................................ 317/230,
231, 233

[56] References Cited
UNITED STATES PATENTS

| 1,918,717 | 7/1933 | Ruben............................. | 317/230 |
| 3,142,886 | 8/1964 | Bronson et al.................. | 317/230 |
| 3,166,693 | 1/1965 | Haring et al.................... | 317/230 |
| 3,302,073 | 1/1967 | Broodo............................. | 317/230 |
| 3,325,699 | 6/1967 | Hellicor........................... | 317/230 |
| 3,330,999 | 7/1967 | Hellicor........................... | 317/230 |
| 3,385,729 | 5/1968 | Larchian........................ | 117/200 |

Primary Examiner—James D. Kallam
Attorneys—C. Cornell Remsen, Jr., Walter J. Baum, Paul W. Hemminger, Percy P. Lantzy, Philip M. Bolton, Isidore Togut and Charles L. Johnson, Jr.

ABSTRACT: To improve the voltage breakdown and leakage current of solid electrolytic capacitors, the dielectric layer is reenforced by an additional layer of silicon nitride, silicon dioxide or increasing the thickness of the original dielectric layer.

PATENTED OCT 19 1971

3,614,544

Inventors
WOLFGANG MOSEBACH
CHRISTOPHER P. PIPER

By Stephen C. Young
Attorney

SOLID ELECTROLYTIC CAPACITORS HAVING AN ADDITIONAL INSULATED LAYER FORMED ON THE DIELECTRIC LAYER

BACKGROUND OF THE INVENTION

The invention relates to solid electrolytic capacitors.

In solid electrolytic capacitors an anode of porous valve metal is anodized to cover all the surfaces of valve metal, both on the outside of the anode and within the pores, with a thin dielectric layer of oxide of the underlying valve metal. The anodized surfaces are then coated with a layer of a semiconducting oxide and then the outer surfaces of the anode body are coated with conductive material providing together the cathode of the electrolytic capacitor.

Electrically a solid electrolytic capacitor may be represented as in FIG. 1.

The arrow indicates parts of the capacitor at a greater distance from the external surface of the porous anode. The eventual failure of such a capacitor in circuits where transient voltage surges may occur is normally due to breakdown of the dielectric layer near the surface of the porous anode. The time constant of those elements of the capacitor on the external surface of the anode is less than that of elements nearer the center. Therefore the dielectric stress during a transient voltage surge will be greater at the outside surface of the anode.

SUMMARY OF THE INVENTION

It is an object of this invention to provide for an improved solid electrolytic capacitor having a dielectric with improved electrical characteristics.

According to a broad aspect of this invention the dielectric strength of the external surfaces of the porous anode body in solid electrolytic capacitors is increased by providing an additional layer of dielectric on the outer surfaces of the body immediately on top of the dielectric layer of oxide of the underlying valve metal.

In one class of embodiment of the present invention the additional dielectric layer is provided by a thin coating of one of the very high dielectric strength materials, such as silicon nitride, boron nitride or silicon dioxide, preferably deposited by means of a gas plasma reaction.

In another class of embodiment, a thickening of the dielectric layer of oxide of the valve metal is provided so that the oxide thickness is greater on the outside of the anode body than within the pores.

DESCRIPTION OF THE PREFERRED EMBODIMENTS

Figure 1:
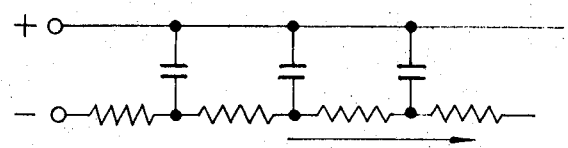
FIG 1 is a circuit representation of the solid electrolytic capacitor.
Figure 2:
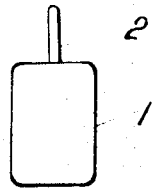
FIG. 2 is an elevational view of a sintered tantalum solid electrolytic capacitor.

The capacitor of FIG. 2 has a body portion 1 formed initially of sintered tantalum and a tantalum wire anode lead 2 embedded in or welded to the body. The plug of sintered tantalum is anodized to form a dielectric layer of tantalum pentoxide on the surfaces of the grains of tantalum both on the outside of the anode body and within the pores thereof. These dielectric surfaces are then coated with a semiconductive oxide layer of manganese dioxide and then a layer of graphite is applied. In practice the graphite does not extend appreciably into the pores of the body, the manganese dioxide layer providing the effective cathode surface within the body. The body is finally coated with silver and encapsulated, for example by covering with epoxy resin.

A tantalum capacitor is taken as typical of solid electrolytic capacitors but other valve metals, notably niobium, which form unidirectionally conducting oxide layers of high dielectric strength may also be used. Although other semiconductive oxides have been proposed from time to time, notably lead oxide, in practice the use of manganese dioxide is universal. The purpose of the manganese dioxide layer is to heal small voids in the dielectric layer of valve metal due to breakdown of the dielectric. At the same time, as indicated above, the manganese dioxide within the pores of the anode provides a cathode electrode for the capacitor. Contact to the cathode electrode is made by means of the graphite coating on the outside of the anode and the overlay of silver. Applicants have found that the performance of the capacitor is considerably improved by depositing a layer of silicon nitride or other high dielectric strength insulation immediately on the dielectric layer of tantalum pentoxide on the outside of the anode body or, alternatively, by thickening up the exterior tantalum pentoxide coating.

Methods of applying suitable dielectric coatings are disclosed in British Pat. No. 1,104,935 by the use of radiofrequency plasma discharge in atmospheres containing gaseous compounds of the materials to be deposited. For depositing, for example, a layer of silicon nitride on the outside of the anode body in accordance with the present invention, after forming, the anode is carefully dried out so that all electrolyte is removed and the anode is then introduced into a low pressure discharge vessel in the neighborhood of a radiofrequency discharge therein, the radio frequency being of the order of 1 Mhz. and the atmosphere being one of silane and ammonia. The anode temperature is maintained at about 300° C. and a thin film of silicon nitride is deposited.

Figure 3:
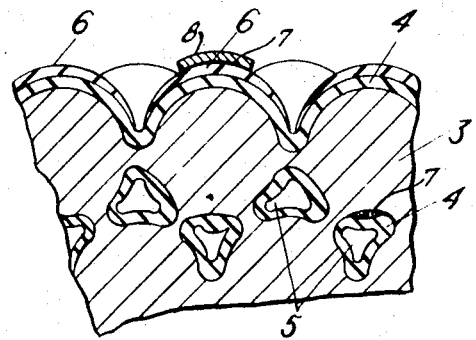
FIG. 3 is a diagrammatic representation of a highly magnified view of a cross section through part of the outer surface of an anode body in accordance with the invention prior to impregnating with semiconductive oxide.

In FIG. 3 spherical grains 3 of tantalum sintered together are shown coated with a dielectric layer 4 of tantalum pentoxide both on outer surface of the anode and within the pores 5. An adherent deposit 6 of silicon nitride is formed on the outer surfaces. Plasma deposition in the internal surfaces of a porous anode is prevented by the electrical screening effect of the metal anode—acting as a Faraday Cage—on the RF field. Penetration of the gaseous condensate into the anode by diffusion is restricted since the mean free path of the gaseous molecules is greater than the mean pore diameter. Thus, the outer grains become coated with caps of silicon nitride whose thickness tapers off towards the pores. Satisfactory results have been obtained by subjecting capacitor anodes to the discharge at low RF power levels—output currents of not greater than 10 amps for periods in excess of 1 hour or for shorter times at higher powers. It was found that, insofar as dissipation factor and leakage current was concerned in the completed capacitor, best results were obtained with short deposition times of about 15 minutes with radiofrequency coil currents of 15 to 20 amps. In both cases the pressure within the discharge vessels was maintained at 0.15 torr with total gas flow rates of 12 ml./min. The deposition rate on a flat substrate was of the order of 0.4 microns/hour. In application to the present invention the maximum thickness of the layers was about 0.6 microns. The gas ratio used was approximately 3 vol. ammonia to 1 vol. silane.

After removal from the discharge vessel, the silicon nitride coated anodes 6 were reformed and then impregnated with the solid electrolyte 7 of manganese dioxide and coated with graphite and silver to form cathode 8 in the normal manner.

The change in capacitance produced by the addition of silicon nitride is found to be very small—less than 1 percent. DC leakage currents at the capacitor working voltage were lower than for untreated capacitors.

As an alternative to providing additional layer 6 (FIG. 3) of silicon nitride, the additional layer 6 may be of tantalum pentoxide which is laid down electrolytically. In order to confine the 50- layer 6 to the outer surface of the anode, a different electrolyte is used having a lower ionic mobility than normal. Two suitable electrolytes have been used in our experiments, namely a 50–50 mixture of ethyleneglycol and water with the addition of 0.005 percent by volume of phosphoric acid or a mixture of 70 percent glacial acetic acid and 30 percent water. The electrolyte used for the primary anodization for producing the dielectric coatings 4 was, in each case, a mixture of water and 0.02 percent phosphoric acid. The voltage applied during the electrolytic deposition of the further layer of tantalum pentoxide was raised to 50 percent above the previous forming voltage at constant current.

An example of the use of the above technique is given as follows:

Tantalum anodes were prepared by pressing bodies from 2.0 gms. of tantalum powder, sintering under vacuum and electrolytically forming a tantalum pentoxide layer in 0.02 percent phosphoric acid to a voltage of 240 volts. Some of these anodes were subsequently used for deposition of $Si_3N_4$ by the method previously described to a thickness of 0.6 microns. In another experiment anodes of 3.6 gms. weight were electrolytically formed to 70 volts and subsequently additional $Ta_2O_5$ was deposited by forming in 50/50 ethylene glycol and water plus 0.005 percent $H_3PO_4$ to 200 volts for 30 minutes. These anodes were subsequently processed into dry tantalum capacitors by known techniques. Results are given below:

| Process | Cap μF at 120 Hz. | Power factor percent at 120 Hz. | Leakage current, μA. At 50 v. | At 35 v. |
|---|---|---|---|---|
| Additional $Si_3N_4$ | 21.9 | 0.9 | 0.10 | |
| Control | 22.0 | 2.0 | 0.17 | |
| Additional $Ta_2O_5$ | 53.0 | 1.7 | | 1.0 |
| Control | 53.0 | 1.7 | | 1.9 |

What is claimed is:

1. A solid electrolytic capacitor including a porous anode of sintered valve metal, a dielectric layer of an oxide of said metal formed on the surface and within the pores of said anode, a solid electrolyte on the dielectric layer within said pores and on said surface, and a cathode layer contacting said electrolyte, the improvement comprising: an additional layer of dielectric material over the surface portion of said dielectric layer of oxide, whereby the strengh of the dielectric on the surface of the anode exceeds the strength of the dielectric within the surface of the pores.

2. A capacitor as claimed in claim 1 wherein said additional layer of dielectric is a layer of silicon nitride.

3. A capacitor as claimed in claim 1 wherein said additional layer of dielectric is a further layer of the oxide of said metal, wherein the thickness of said oxide on said anode is greater on the outside of said anode than within the pores.

4. A capacitor according to claim 2, wherein said additional layer of dielectric has a maximum thickness of 2 microns.

5. A capacitor according to claim 1, wherein said anode is tantalum.

6. A capacitor according to claim 1, wherein said additional layer of dielectric material is silicon dioxide.

7. A method according to claim 1, wherein said additional layer of dielectric material is boron nitride.